US010867276B1

(12) United States Patent
Lopez et al.

(10) Patent No.: US 10,867,276 B1
(45) Date of Patent: Dec. 15, 2020

(54) MULTI-CHANNEL ORDER MANAGEMENT

(71) Applicant: AMAZON TECHNOLOGIES, INC., Reno, NV (US)

(72) Inventors: Gustavo Eduardo Lopez, Seattle, WA (US); Ashraf AlKarmi, Seattle, WA (US); Kristin Whitney Baker, Seattle, WA (US); Matthew Brett Roemer, Dallas, TX (US); Pawan Lata Uppuluri, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 767 days.

(21) Appl. No.: 15/083,891

(22) Filed: Mar. 29, 2016

(51) Int. Cl.
*G06Q 30/06* (2012.01)
*G06Q 10/08* (2012.01)
*G06Q 50/12* (2012.01)

(52) U.S. Cl.
CPC ..... *G06Q 10/0835* (2013.01); *G06Q 30/0635* (2013.01); *G06Q 50/12* (2013.01)

(58) Field of Classification Search
USPC .................................................... 705/15, 16
See application file for complete search history.

(56) References Cited

U.S. PATENT DOCUMENTS

| | | | |
|---|---|---|---|
| 9,595,061 B1* | 3/2017 | Ryan | G06Q 20/202 |
| 2016/0171584 A1* | 6/2016 | Cao | G06O 30/0282 |
| | | | 705/26.62 |
| 2016/0350837 A1* | 12/2016 | Williams | G06Q 30/0633 |
| 2017/0098264 A1* | 4/2017 | Priebatsch | G06Q 20/3224 |

* cited by examiner

*Primary Examiner* — Fahd A Obeid
*Assistant Examiner* — Reva R Moore
(74) *Attorney, Agent, or Firm* — Lowenstein Sandler LLP (57) ABSTRACT

A merchant system including an order management application and method of integrating orders received from multiple ordering channels is described. An aggregated order queue is established including multiple orders from multiple different ordering channels. The orders are processed for fulfillment and a delivery channel is selected from multiple delivery channels for delivery of the one or more items of the order. The multiple orders, regardless of the ordering channel originating the order, and delivery channels may be managed via a single user interface.

18 Claims, 6 Drawing Sheets

MULTI-CHANNEL ORDER MANAGEMENT

BACKGROUND

In a marketplace environment, a merchant may receive customer orders from many different storefronts associated with different ordering platforms. For example, a restaurant may intake food and beverage orders using a variety of different ordering channels, each requiring the use of a dedicated order intake system associated with the respective ordering platform. To interface with the various different order platforms, a restaurant may need to use many different ordering applications running on different electronic devices (e.g., electronic tablets).

In addition, the various different ordering channels may be associated with respective courier services for delivery of the orders to the customers. In such cases, the merchant fulfills the order and facilitates delivery of the order via the courier service selected by the channel associated with the order's intake, without the merchant having a choice with respect to the delivery service used in connection with the order.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

The present disclosure relates to managing orders received by a merchant from multiple different ordering channels and facilitating delivery of the orders by allowing the merchant to select a desired delivery channel from among multiple different delivery channels (e.g., dispatch systems, delivery staff, etc.). In an example, a merchant system including an order management application is provided to operatively couple with the multiple ordering channels (e.g., order intake storefronts) and multiple delivery channels (e.g., courier services). The order management application is executable by an electronic device (e.g., a tablet) and integrates the various orders received from the multiple ordering channels into a single interface accessible by one or more employees of the merchant responsible for fulfilling the orders (e.g., providing an estimated completion time, initiating preparation of the order, etc.).

With the emergence of electronic commerce, merchants (e.g., food and beverage providers) offer an increasing online presence to enable a customer to place orders via an electronic interface. Many independent online ordering channels are available to receive online orders from the customers and provide an application specific to the particular ordering channel to pass those orders to the ultimate merchant for fulfillment. As such, conventional marketplaces require a merchant to manage multiple ordering channels using many different applications operating on a number of different electronic devices.

In addition, many ordering channels also offer a delivery service for delivery of the one or more items associated with the order to the customer following fulfillment by the merchant. In other cases, the ordering channel may use a generic delivery service. In both instances, the merchant is unable to select the delivery channel or optimize delivery of an order in view of the multiple delivery channel options.

According to the present disclosure, the merchant may intake orders from the multiple different ordering channels and manage those orders using the order management application. Integration of the multiple ordering channels into the single order management application allows the merchant to reduce the number of electronic devices required to interface with the multiple ordering channels, reduce the time associated with training the merchant staff relating to the order intake, fulfillment, and delivery, provide a uniform order template including the consistent presentation and capture of order details for use in generating analytics relating to the order management experience.

In an implementation, the order management system receives multiple orders from multiple different ordering channels and converts each order from a format associated with the source ordering channel into a uniform format of the order management system. The order management system further aggregates the formatted orders into an order queue. The order management system may extract order details associated with the orders including an identification of the one or more items ordered, the source of the order (i.e., the ordering channel), an identification of the customer including an address for delivery of the order, special requests relating to the order, a time the order was placed or processed, etc.

The order management system may also communicate with the multiple delivery channels to collect information relating to a current or predicted status of the respective delivery channels. The status information received from a delivery channel may be used by the order management system to determine delivery data for the delivery channel. The order management system may use the delivery data associated with each of the candidate delivery channels as a metric to select a particular delivery channel for delivery of a given order.

In the following discussion, a general description of the system and its components is provided, followed by a discussion of the operation of the same. Although the description includes certain examples relating to the order management application employed in a food services environment, it is to be appreciated that the order management system is not limited to managing food orders. For example, the order management system may be used to manage orders relating to any goods or services having ordering and delivery components.

Figure 1:
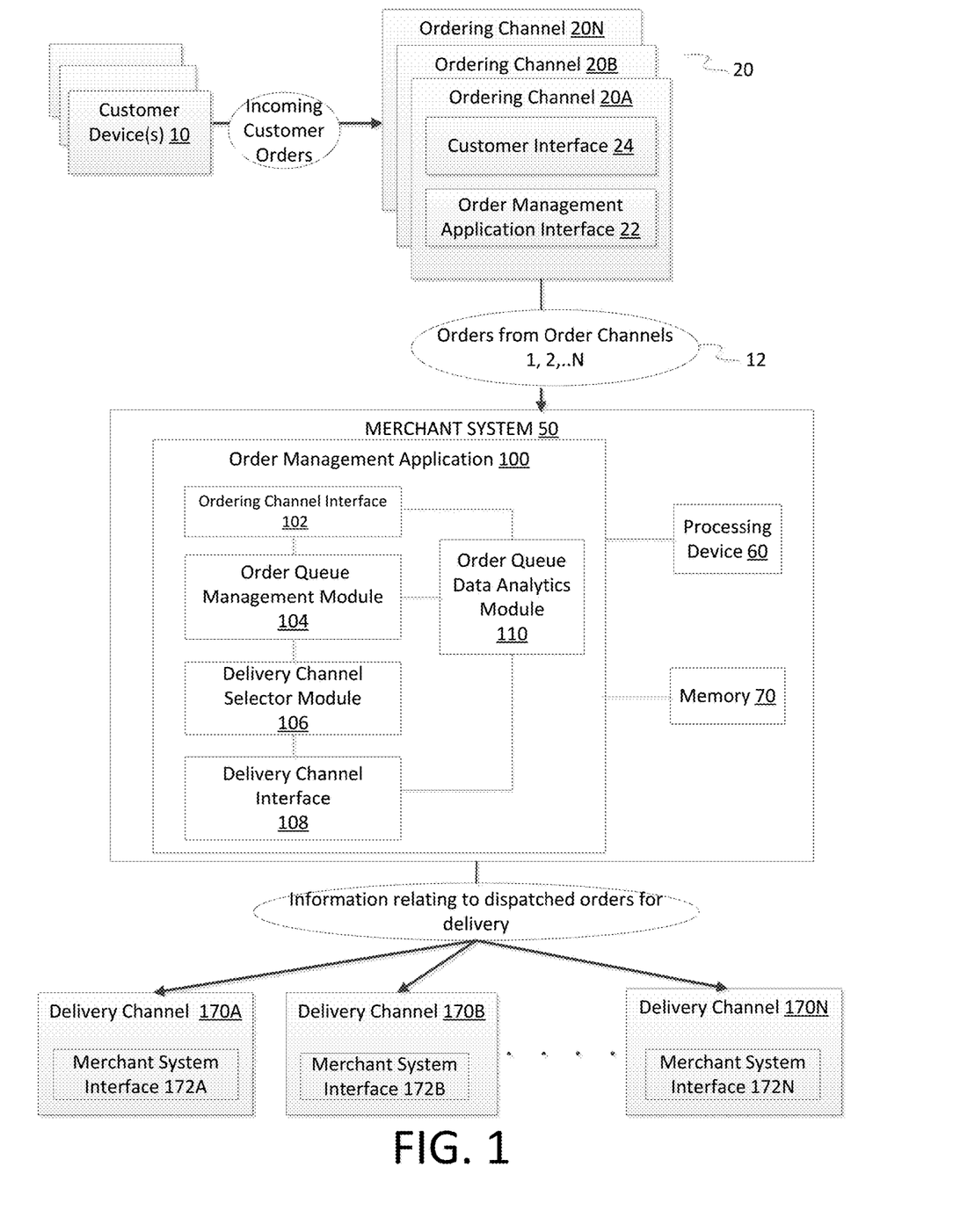
FIG. 1 illustrates a system for processing orders received from multiple order channels and managing multiple delivery channels, according to various embodiments of the present disclosure.

FIG. 1 illustrates an example marketplace environment including a merchant system 50 having an order management application 100 interfacing with multiple ordering channels 20 (e.g., ordering channel 20A, ordering channel 20B, . . . ordering channel 20N) to process and manage orders received from customer devices 10. The merchant system 50 may include a processing device 60 to execute the order management application 100 and a memory 70 to store data associated with the operations and functions of the order management application 100.

In an implementation, an incoming customer order may be processed through a customer interface 24 of one of the multiple ordering channels 20. In an implementation, the ordering channels 20 include an order management application interface 22 to communicate with the order management application 100. In implementations, the ordering channels 20 may be a web-based portal (e.g., a website or web-enabled application) accessible by the customer devices 10 to receive orders for goods, services, or both (e.g., food). Exemplary ordering channels 20 may include, but are not limited to, Amazon Prime Now, Bite Squad, GrubHub, etc.

The order management application 100, used to manage and fulfill the orders 12 received from the ordering channels 20, may include an ordering channel interface 102, an order queue management module 104, a delivery channel selector module 106, a delivery channel interface 108, and an order queue data analytics module 110 along with various other components. The ordering channel interface 102 may communicate with the ordering channels 20 to receive customer orders initiated via the ordering channels. The order queue management module 104 converts each of the orders from a format associated with the source ordering channel into a format associated with the order management application 100 and aggregates multiple orders into an aggregated order queue. In an implementation, the order queue management module 104 extracts order details associated with orders in the aggregated order queue. Exemplary order details include, but are not limited to, an identification of the one or more items in the order, an identification of the customer associated with the order including a delivery address for the customer, an identification of the ordering channel 20 that is the source of the order, an estimated preparation time associated with the one or more items of the order, a time the order is placed, etc.

The delivery channel selector module 106 selects a delivery channel 170 from a set of candidate delivery channels (e.g., Delivery Channel 170A, Delivery Channel 170B, through Delivery Channel 170N, wherein any number of delivery channels 170 may communicate with the order management application 100). The delivery channel interface 108 communicates with a merchant system interface 172A, 172B, and 172N of the multiple delivery channels 170A, 170B, and 170N and provides information relating to dispatched orders to a selected delivery channel to enable the delivery channel to process an order delivery. In an implementation, that delivery channel interface 108 communicates with a merchant system interface 172A, 172B, 172N of the respective delivery channels 170A, 170B, 170N to exchange the information relating to dispatched orders, status information provided by the delivery channels 170A, 170B, 170N that may be used to determine an availability of the delivery channels 170A, 170B, 170N, and other information from the delivery channels 170A, 170B, 170N including confirmation of delivery, delivery statistics (e.g., an amount of time to deliver the order, customer feedback regarding the order, the ordering channel 20A, 20B, 20N, and the delivery channel 170A, 170B, 170N, etc.) and the delivery of the order.

The order queue data analytics module 110 reviews the order details associated with the orders in the aggregated order queue, information relating to the processing of incoming customer orders received from the ordering channels 20A, 20B, 20N via the ordering channel interface 102, and information relating to the delivery of orders to customers received from the delivery channels 170A, 170B, 170N via the delivery channel interface 108 and generates analytics data based on the reviewed information. Exemplary analytics data may include, but is not limited to, customer feedback and ratings relating to the ordering channel and delivery channel, performance metrics relating to the ordering channel and delivery channel, etc.

Figure 2:
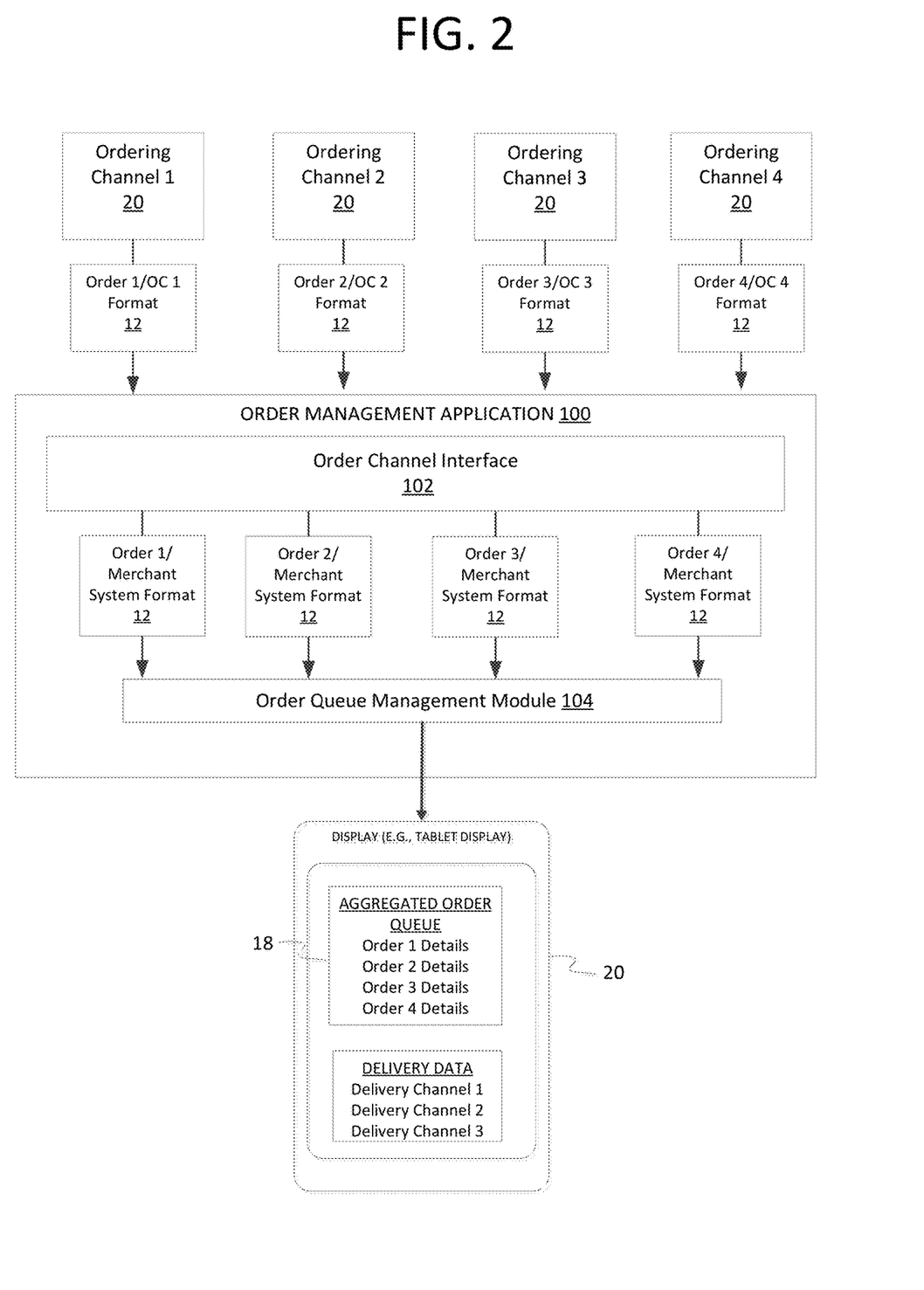
FIG. 2 illustrates an order management application to integrate multiple orders from different ordering channels into an aggregated order queue, according to various implementations of the present disclosure.

FIG. 2 illustrates a non-limiting example of an order management application 100 processing and managing multiple orders and associated order information 12 (e.g., order 1, order 2, order 3, and order 4) received from multiple different ordering channels 20 (ordering channel 1, ordering channel 2, ordering channel 3, and ordering channel 4). The order management application 100 employs an ordering channel interface 102 to communicate with the respective ordering channels 250. In an implementation, an ordering channel 20 (e.g., ordering channel 1) may call an application program interface (API) via the order channel interface 102 to process the communication of the order information 12 to the order management application 100. In an implementation, a particular API may be associated with each of the respective ordering channels 20 to enable the communication of the order information. According to exemplary implementations, the order information 12 may be communicated to the ordering channel interface 102 by the ordering channels 20 via any suitable communication method, including, for example, e-mail communications, fax communications, and telephone communications.

In an implementation, the order information 12 may be received by the order channel interface 102 as an electronic file in a format suitable for processing by the source ordering channel 20. For example, order 1 may be received from ordering channel 1 in a format associated with ordering channel 1 (i.e., order channel (OC) format 1), order 2 may be received from ordering channel 2 in a format associated with ordering channel 2 (i.e., OC format 2), order 3 may be received from ordering channel 3 in a format associated with ordering channel 3 (i.e., OC format 3), and order 4 may be received from ordering channel 4 in a format associated with ordering channel 4 (i.e., OC format 4).

In an implementation, the order channel interface 102 converts the order information 12 from a first format associated with the ordering channel (e.g., OC format 1 associated with ordering channel 1) to a common format (a merchant system format) for processing by the order management application 100 of the merchant system. In converting the format of the order information into the merchant system format for all of the orders, the order queue management module 104 extracts order details associated with each order and organizes the extracted order details into a uniform template or structure. In an implementation, the extracted order details may be collected, organized, and displayed in a consistent manner for all orders. In addition, conversion to the merchant system format enables the order information 12 for the various incoming orders to be presented in a uniform manner to the order queue management module 104.

The order queue management module 104 may organize the uniformly arranged order details associated with the multiple orders received from the various different ordering channels 20 into an aggregated order queue 18. In aggregating the multiple orders into the aggregated order queue, a common and consistent display may be presented to a user of the merchant system (e.g., a restaurant employee). As shown in the example of FIG. 2, the aggregated order queue 18 may include order details associated with multiple orders received from multiple different ordering channels (e.g., order 1 details, order 2 details, order 3 details, and order 4 details) presented via a user interface or display of an electronic device (e.g., tablet 20) in a consistent manner to facilitate the processing of the various orders by the merchant system and associated user(s).

In addition, as shown in FIG. 2, the user interface may further display the delivery data associated with the various candidate delivery channels (e.g., Delivery Channel 1, Delivery Channel 2, and Delivery Channel 3). As described in greater detail below, delivery data may be determined by the order management application 100 for each delivery channel based on status information received from the respective delivery channels. The delivery data may be presented to a user via the user interface of the electronic device (e.g., tablet 20). In an implementation, a selection of particular delivery channel may also be displayed to a user via the tablet 20. In an alternative embodiment, the delivery data may be displayed via the tablet 20 along with a prompt enabling a user to select a delivery channel for a particular order or submit a preference relating to a delivery channel for the particular order.

Advantageously, conversion of the orders received from the multiple different ordering channels into a uniform template including order details and aggregating the order details into an aggregated order queue allows a merchant to manage all electronic orders via a single interface of an electronic device. The maintenance and management of multiple different electronic devices having different interfaces with non-uniform presentations of order details may be eliminated. Furthermore, more efficient processing of the orders from the variety of ordering channels may be realized resulting in a better user experience for the merchant's users and a better overall customer experience.

Figure 3:
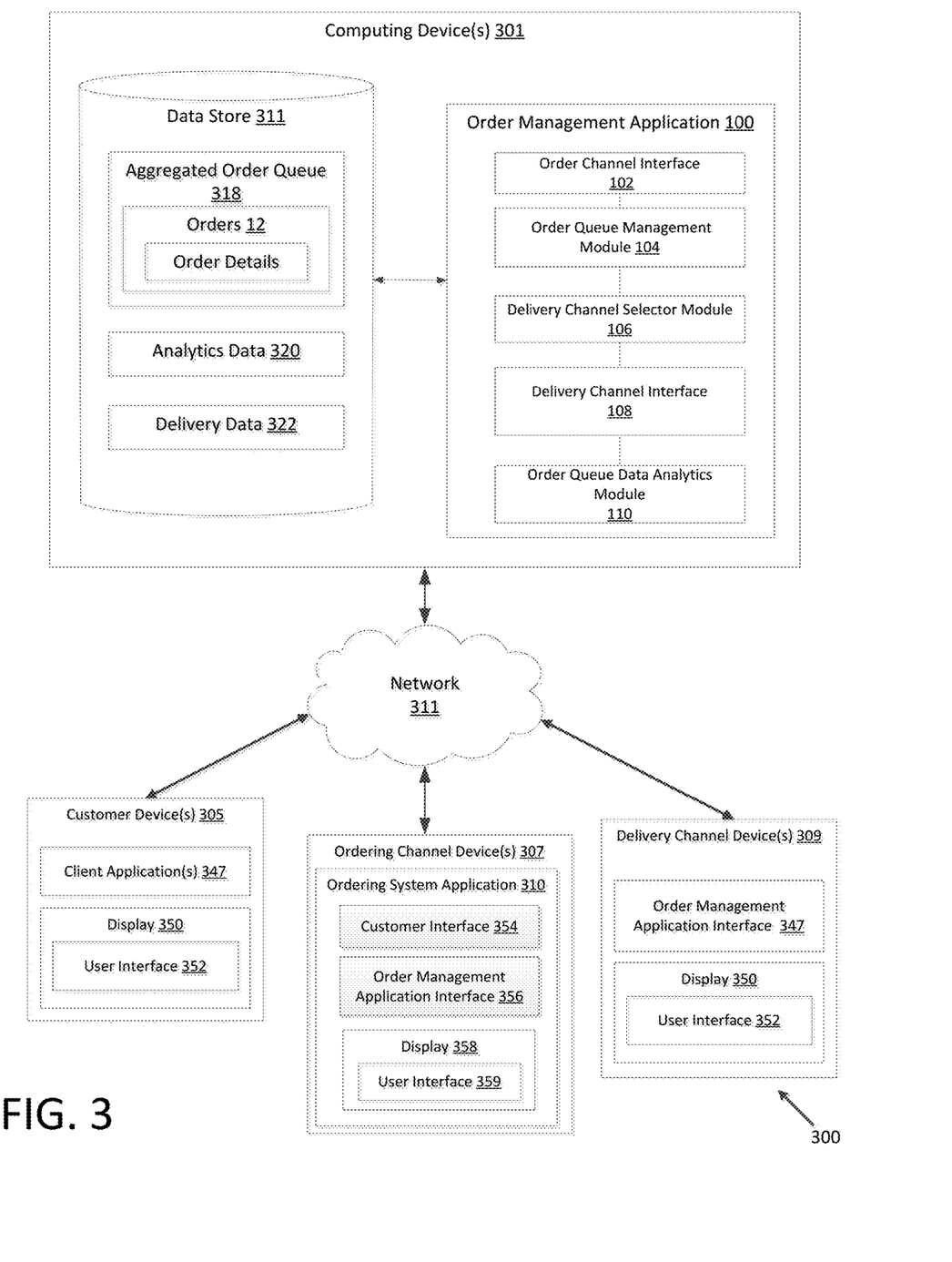
FIG. 3 illustrates a networked environment according to various embodiments of the present disclosure.

With reference to FIG. 3, shown is a networked environment 300 according to various embodiments. The networked environment 300 includes one or more computing devices 301, one or more customer devices 305, one or more ordering channel devices 307, one or more delivery channel devices 309, and/or other device(s), which are in data communication via a network 311. The network 311 includes, for example, the Internet, intranets, extranets, wide area networks (WANs), local area networks (LANs), wired networks, wireless networks, or other suitable networks, etc., or any combination of two or more such networks.

The one or more computing devices 301 may comprise, for example, a desktop computer, a mobile computing device (e.g., a tablet), a server computer or any other system providing computing capability. Alternatively, the networked environment 300 may employ multiple computing devices 301 that are arranged, for example, in one or more server banks or computer banks or other arrangements. Such computing devices 301 may be located in a single installation or may be distributed among many different geographical locations. For example, the networked environment 300 may include a plurality of computing devices 301 that together may comprise a cloud computing resource, a grid computing resource, and/or any other distributed computing arrangement. In some cases, the networked environment 300 may correspond to an elastic computing resource where the allotted capacity of processing, network, storage, or other computing-related resources may vary over time.

Various applications and/or other functionality may be executed in the networked environment 300 according to various embodiments. Also, various data is stored in a data store 311 that is accessible to the one or more computing device 301. The data store 311 may be representative of multiple data stores 311. The data stored in the data store 311, for example, is associated with the operation of the various applications and/or functional entities described below.

The components executed on the one or more computing device 301, for example, include an order management application 100 and other applications, services, processes, systems, engines, or functionality not discussed in detail herein. In an implementation, the computing device 301 is a single device (e.g., a tablet) including the order management application 100 and a data store 311.

The order management application 100 is executed to facilitate the online processing and managing of one or more orders received from order channel devices 307 over the network 311. The order management application 100 also performs various backend functions associated with the online presence of a merchant in order to facilitate the processing of the orders and coordination with delivery channels, as described below. For example, the order management application 100 may generate an estimated preparation time relating to items of an order, track the progress of an order, provide notifications to a user relating to the status of an order, etc.

The customer device(s) 305 is representative of multiple customer devices that may be coupled to the network 307. The customer device(s) 305 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The customer devices 305 may include a display 350. The display 350 may comprise, for example, one or more devices such as liquid crystal display (LCD) displays, gas plasma-based flat panel displays, organic light emitting diode (OLED) displays, LCD projectors, or other types of display devices, etc.

The customer device(s) 305 may be configured to execute various applications such as a client application 347 and other applications. The client application 347 may be executed in a customer device 305, for example, to access network content served up by the computing environment 300 and/or other servers, thereby rendering a user interface 352 on the display 350. The client application 347 may, for example, correspond to a browser, a mobile application, etc., and the user interface 352 may correspond to a network page, a mobile application screen, etc. provided by an ordering channel device 307. The customer device 305 may be configured to execute applications beyond the client application(s) 347 such as, for example, browsers, mobile applications, email applications, social networking applications, and/or other applications. The client application 347 of the customer device 305 is configured to operatively couple to the order channel device(s) 307 to facilitate the submission of an order for one or more items provided by the merchant operating the one or more computing devices 301.

In an implementation, each of the multiple ordering channels may operate one or more ordering channel devices 307 including an ordering system application 310 having a customer interface 354 and an order management application interface 356 and a display 358 for rendering a user interface 359. The ordering channel device(s) 305 may comprise, for example, a processor-based system such as a computer system. Such a computer system may be embodied in the form of a desktop computer, a laptop computer, one or more server computers, personal digital assistants, cellular telephones, smartphones, set-top boxes, music players, web pads, tablet computer systems, game consoles, electronic book readers, or other devices with like capability.

The ordering system application 310 may be executed in an ordering channel device(s) 307, for example, to receive customer orders from the customer device(s) 305 via the customer interface 354 and provide orders to the order management application 100 via the order management application interface 356 and the network 311. The ordering channel device(s) 307 may also include the display 358 to render a user interface 359 to a user of the ordering channel device(s) 307.

In an implementation, each of the multiple delivery channels may operate one or more delivery channel devices 309 including an order management application interface 347 and a display 350 for rendering a user interface 352. The delivery channel device(s) 309 may comprise, for example, a processor-based system such as a computer system. Such a computer system may be embodied in the form of a desktop computer, a laptop computer, one or more server computers, personal digital assistants, cellular telephones, smartphones, set-top boxes, music players, web pads, tablet computer systems, game consoles, electronic book readers, or other devices with like capability.

The delivery channel device 309 may include the order management application interface 347 to communicate with the order management application 100. In an implementation, the order management application interface 347 may provide status information relating to the delivery channel (e.g., a current bandwidth, an estimated delivery time for an order, a current queue of pending deliveries, etc.) to enable the order management application 100 to determine delivery data for the respective delivery channel. Upon selection as the desired delivery channel, the order management application interface 347 receives order details for an order from the order management application 100. A user of the delivery channel devices 309 may review the delivery requests and information (e.g., order details) relating to dispatched orders sent to the delivery channel for delivery to a customer.

The order management application 100 is executed to enable intake and management of the orders received from the multiple ordering channel devices 307 and the coordination of delivery of items of the orders via the delivery channels operating the delivery channel devices 309. The order management application 100 provides for the integration of multiple different ordering channels into a single application (i.e., the order management application 100) to enable the aggregation of multiple orders into a single aggregated order queue. Establishing an aggregated order queue allows for the display via a single user interface of all orders pending at a given time.

The data stored in the data store 311 includes, for example, data related to the aggregated order queue 318, analytics data 320, delivery data 322, and potentially other data relating to the management of the intake and delivery processes described herein. The data stored as an aggregated order queue 318 may relate to a plurality of orders 12 and the associated order details. The order details may include any suitable information identifying an order in the aggregated order queue, such as the one or more items in the order, information identifying the associated ordering channel, estimated preparation time associated with the one or more items in the order, information identifying the customer initiating the order including the customer's delivery address, special requests relating to the order (e.g., requests for utensils, specific food preparation requests, etc.).

The various data stored in data store 311 as the orders 12 and order details may be stored in a format associated with the order management application 100. In an implementation, the format of the order management application 100 may be customized, edited, changed, adjusted, modified, etc. by the merchant operating the order management application 100.

Data associated with analytics data 320 may include data generated by the order management application 100 based on an analysis of the aggregated order queue 318 data, the delivery data 322, or both. The analytics data 320 may be stored for use in generating reports for review by any one of the merchant, the customers, the one or more ordering channels, or the one or more delivery channels, as described in greater detail below. The analytics data 320 may be characterized, for example, by a one or more metrics or measurements representing performance related characteristics associated with the ordering channels, delivery channels, the merchant, or a combination thereof.

The delivery data 322 represents information associated with the one or more delivery channels. The delivery data 322 may be determined based on status information received from the one or more delivery channel devices 309, as described in greater detail below. The delivery data 322 may be used by the order management application 100 to select a delivery channel for delivery of a particular order.

The order management application 100 may include various components configured to execute the order management process, according to implementations of the present disclosure. The order channel interface 102 receives or accesses the orders 12 from the multiple ordering channel devices 307. In an implementation, the order channel interface 102 may include a web-based interface, an electronic mail interface, a facsimile interface, a telephone interface, or any suitable interface configured to receive order information. The order channel interface 102 may also be configured to send information to the ordering channel devices 307, such as reports based on the analytics data 320, notification or confirmations associated with the orders 12, reports relating to commissions earned by the ordering channels, etc.

The order queue management module 104 processes the orders received from the ordering channels via the order channel interface 102, converts each of the orders from a format associated with the source ordering channel into a format associated with the order management application 100, extracts the order details, and aggregate multiple orders to establish the aggregated order queue (as shown in the example in FIG. 2). In an example, the merchant may establish a preferred format for the organization and content of an order. In this example, the preferred format may include fields having data relating to the one or more ordered items, the delivery address of the customer, an identification of the source ordering channel, the time the order was placed, an estimated preparation time associated with the order, and the customer's special requests. The orders received from the ordering channel devices 307 are reviewed by the order queue management module 104 and the order details relating to the merchant's format is extracted to create a storable record associated with each order 12. The multiple orders 12 and associated order details are combined into an aggregated order queue 318. Advantageously, a single aggregated order queue 318 may be established which includes order details relating to all of the pending orders 12 being processed by the order management application 100 at a given time, irrespective of the one or more ordering channels from which the orders were received.

The delivery channel selector module 106 selects a particular delivery channel for delivery of each respective order. The delivery channel selector module 106 may select a delivery channel for a particular order based on the delivery data 322. In an example wherein the aggregated order queue includes order details for eight different orders, the delivery channel selector module 106 may select: i) delivery channel 1 for delivery of orders 1, 6, and 8; ii) delivery channel 2 for orders 2 and 5; and iii) delivery channel 3 for orders 3, 4, and 7.

The delivery data 322 may be derived based on status information received from the delivery channel devices 309 via the delivery channel interface 108. For example, the status information for delivery channel 1 may indicate a current delivery window of 30-45 minutes for orders in a first geographic zone (e.g., all delivery addresses in a first zip code). Based on this status information, the delivery channel selector module 106 may generate an availability metric associated with delivery channel 1 that is a function of the status information. In an example, the delivery data 322 for channel 1 may include a filter for only those orders having a delivery address in the first zip code which have a target delivery time of less than 45 minutes.

In implementations, the delivery data 322 may be generated based on rules and preferences provided by the merchant. For example, a merchant may establish a rule or preference in the order management application 100 indicating that any delivery channel having a current delivery window of greater than 40 minutes is excluded as a candidate delivery channel for orders in the current aggregated order queue. In another example, a merchant may establish a rule or preference in the order management application 100 indicating a preferred delivery channel for orders to be delivered in a given geographic region, to a set of identified customers, at a particular time of day, etc. The delivery data 322 may also include performance information associated with the various delivery channels, such as, historical delivery data associated with each of the delivery channels. In addition, the delivery data may include feedback from the one or more customers relating to the delivery channel, the ordering channel, the merchant, or a combination thereof.

In an implementation, the delivery channel selector module 106 may receive input from a user of the order management application 100, such as a selection by the restaurant manager of a particular delivery channel from a list of candidate delivery channels.

Selecting a delivery channel from multiple candidate delivery channels enables the order management application 100 to track a load or amount of pending orders placed on the various candidate delivery channels and balance the load for current and upcoming orders. Accordingly, the delivery channel selector 108 may load balance the candidate delivery channels in view of the current status information associated with the candidate delivery channels to optimize the assignment of the deliveries to achieve a target delivery efficiency.

The order queue data analytics module 110 reviews the order details for the orders 12 in the aggregated order queue, historical order details relating to previous aggregated order queues, delivery data including historical delivery data, and other data collected from the merchant (e.g., notes relating to an ordering or delivery channel, etc.) to generate analytics data 320. The analytics data 320 may be related to any attribute, characteristic, or parameter associated with the ordering, fulfilling, and delivering of the orders. For example, a merchant may establish rules or preferences in the order management application 106 defining the one or more analytics that the merchant wishes to track and monitor. In an example, the analytics data may include data relating to order fulfillment times, delivery times, ordering channel and delivery channel experiences, customer ordering habits, etc.

Figure 4:
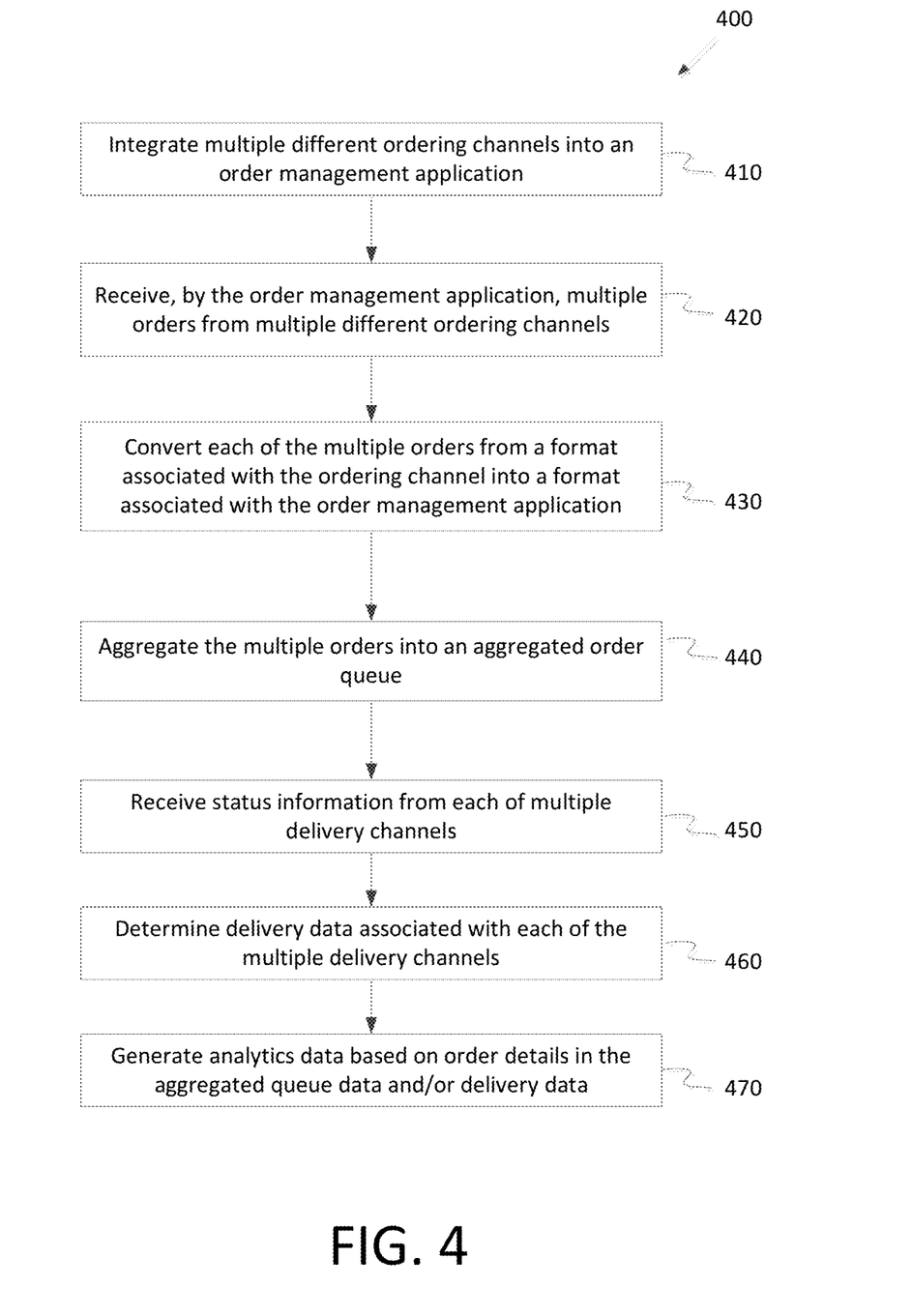
FIG. 4 depicts a flowchart illustrating one example of functionality implemented by an order management system, according to various embodiments of the present disclosure.

FIG. 4 illustrates a flowchart that provides an example of an order management process 400 executed by an order management application 100 executed by a merchant system, according to various implementations of the present disclosure. It is understood that the flowchart of FIG. 4 provides an example of the many different types of functional arrangements that may be employed to implement the operation of the order management application 100 as described herein. As an alternative, the flowchart of FIG. 4 may be viewed as depicting an example of steps of a method implemented in the computing environment 300 of FIG. 3, according to one or more embodiments.

In block 410, multiple different ordering channels and platforms are integrated into an order management application (e.g., order management application 100 of FIGS. 1-3). Integrating the multiple different ordering channels and respective interfaces allows for the exchange of communications and information between the multiple ordering channels and the order management application. In an implementation, the integration of an ordering channel includes providing an API configured to interface with the ordering channel. For example, the order management application may include a first API configured to enable communications with a first ordering channel, a second API configured to enable communications with a second ordering channel, a third API configured to enable communications with a third ordering channel, and a fourth API configured to enable communications with a fourth ordering channel. In an implementation, the order management application may include an API configured to enable communication with multiple ordering channels.

Advantageously, the integration of the multiple ordering channels into the order management application allows for the order management application to be executed by a single computing device (e.g., a tablet) and information relating to the ordering channels displayed via a single user interface (e.g., a display of the tablet). This eliminates the need for a merchant to maintain multiple electronic devices dedicated to communicating with the multiple ordering channels.

In block 420, multiple orders are received from the multiple different ordering channels. In an implementation, an order may be received from a first ordering channel via a web-based communication wherein the first ordering channel calls an API in the order management application to enable communication of the order information. In another implementation, the order may be received by the order management application via an electronic mail communication, a facsimile communication, a telephone communication, or other communication method. In an implementation, upon receipt of an order, the order management application may create a record relating to the order to be stored by the order management application (e.g., in a memory such as memory 70 in FIG. 1, in cache, etc.). In an implementation, the merchant may have their own ordering channel (e.g., an online ordering portal accessible via the merchant's website, a mobile application, etc.). Orders received from the merchant's native ordering channel may be received and integrated with the orders received from the other ordering channels (e.g., the third party ordering channels).

In an example, the ordering channel acts as an intermediary between a customer and the order management application (e.g., the ordering channel is operated independently from the merchant's systems). For example, the customer may submit his or her order via the ordering channel (e.g., Amazon Prime Now, Bite Squad, GrubHub) which processes the order and submits the order to the order management application.

In block 430, orders received from the ordering channel (e.g., an independent ordering channel) are converted into a format associated with the order management application. The order format may be a template including fields defining the order details that the merchant elects to capture as part of the order intake process. In an implementation, the merchant may customize the order format by selecting the particular fields, structure, layout, appearance, etc. of the order. For example, the order format may be configured to include order details such as information identifying the one or more items ordered, an estimated or projected preparation time, an identification of the customer, a delivery address associated with the customer, an identification of the ordering channel, any special requests made by the customer, etc. In an implementation, multiple orders from multiple different ordering channels which are received in different formats (i.e., the format of the ordering channel) are all converted into a common order format for processing by the order management application.

In block 440, the multiple orders are aggregated into an aggregated order queue. As shown in the example illustrated in FIG. 2, the aggregated order queue includes a listing of the current or pending orders and the associated order details. Advantageously, consolidation of the multiple orders into the aggregated order queue enables all pending orders to be displayed via a single user interface to one or more users of the merchant system. For example, an restaurant employee may interact with a single interface presenting each of the pending orders with a consistent look and feel, wherein the order details for each order are uniform (e.g., the fields including the order details are consistent for each order in terms of appearance, layout, and positioning). To this end, a merchant may train employees to interface with a single system presenting the aggregated order queue.

In block 450, status information may be received from the one or more available delivery channels. In an implementation, the delivery channel may send status information to the order management application in response to a request from the order management application or on a periodic basis (e.g., every 30 minutes, every hour, etc.). The status information provides details relating to a current bandwidth, capacity, load, availability, etc. of the delivery channel. For example, a delivery channel may send status information indicating that the delivery channel currently has three drivers available in a given geographic area.

In block 460, delivery data is determined for a delivery channel based on the status information associated with that delivery channel. The delivery data may include a metric, measurement, or indicator of a delivery channel's availability, such as an estimated delivery time determined for the delivery channel. In an example, the delivery data for multiple delivery channels (e.g., delivery channel 1 and delivery channel 2) may be compared to enable the order management application to select a delivery channel for delivery of a given order. The delivery data may also include other information relating to the performance of a delivery channel, such as, for example, feedback received from customers, ordering channels, or both. In an implementation, at least a portion of the delivery data (e.g., information illustrating a current load and capacity for each of the available delivery channels) may be presented to a user of the merchant system via a user interface (e.g., as shown in FIG. 2).

In an implementation, determination of the delivery data may include calculating an availability measurement for each of the delivery channels. The availability measurement may be a value representing whether a delivery channel is appropriate for delivery of the first order. In an example, the availability measurement may be a score assigned to each of the delivery channels, wherein the score is a numerical value representing a comparative analysis of the delivery channels and their suitability for delivery of the first order. For example, with respect to candidates for the delivery of the first order, the delivery data may include a score of 89 out of 100 for delivery channel 1, a score of 93 out of 100 for delivery channel 2, and a score of 73 out of 100 for delivery channel 3. The score may be based on one or more factors relating to the availability and suitability of a delivery channel including, but not limited to, a current capacity of the delivery channel (e.g., a number of available drivers), a historical rating relating to the delivery channel (e.g., a measure of the delivery channel's past performance), a delivery location for the first order, a size of the order, a customer preference, an exclusivity arrangement with a delivery channel (e.g., a merchant agreement with a delivery channel to use the delivery channel for all orders in a particular geographic zone), one or more other pending orders in a same geographic area, etc.

In block 470, the analytics data is generated based on the order details in the aggregated order queue, the delivery data, or a combination thereof. In generating the analytics data, the aggregated order queue data may include the order details relating to the current aggregated order queue and historical aggregated order queue data. In addition, the delivery data may include current and historical delivery data. For example, the order management application may generate analytics data based on the order details from the previous 30 days (e.g., stored aggregated order queue data relating to the past 30 days). The analytics data generated by the order management application may include any metrics or measurements relating to customer ordering behavior, ordering channel performance, delivery channel performance, merchant order fulfillment performance, or a combination thereof. Rules, preferences, thresholds, and data analytics models may be used to define the analytics parameters and generate the analytics data. For example, analytics data may be generated to determine which delivery channel performed the 'best' during the 30 weeks. In this example, criteria may be defined to determine a performance metric relating to the delivery channel, such as a customer rating or a comparison of an actual delivery time to an estimated delivery time. The 'best' delivery channel may be determined by comparing the customer ratings given to multiple delivery channels during a given period of time. In another example, the 'best' delivery channel may be determined by comparing the actual delivery time to estimated delivery time ratio for each of the multiple delivery channels.

In an example, the analytics data may include an indication of menu or catalog differences between the multiple ordering channels and a measurement of how the menu or catalog differences influence performance (e.g., effectiveness in terms of customer ordering behavior).

Figure 5:
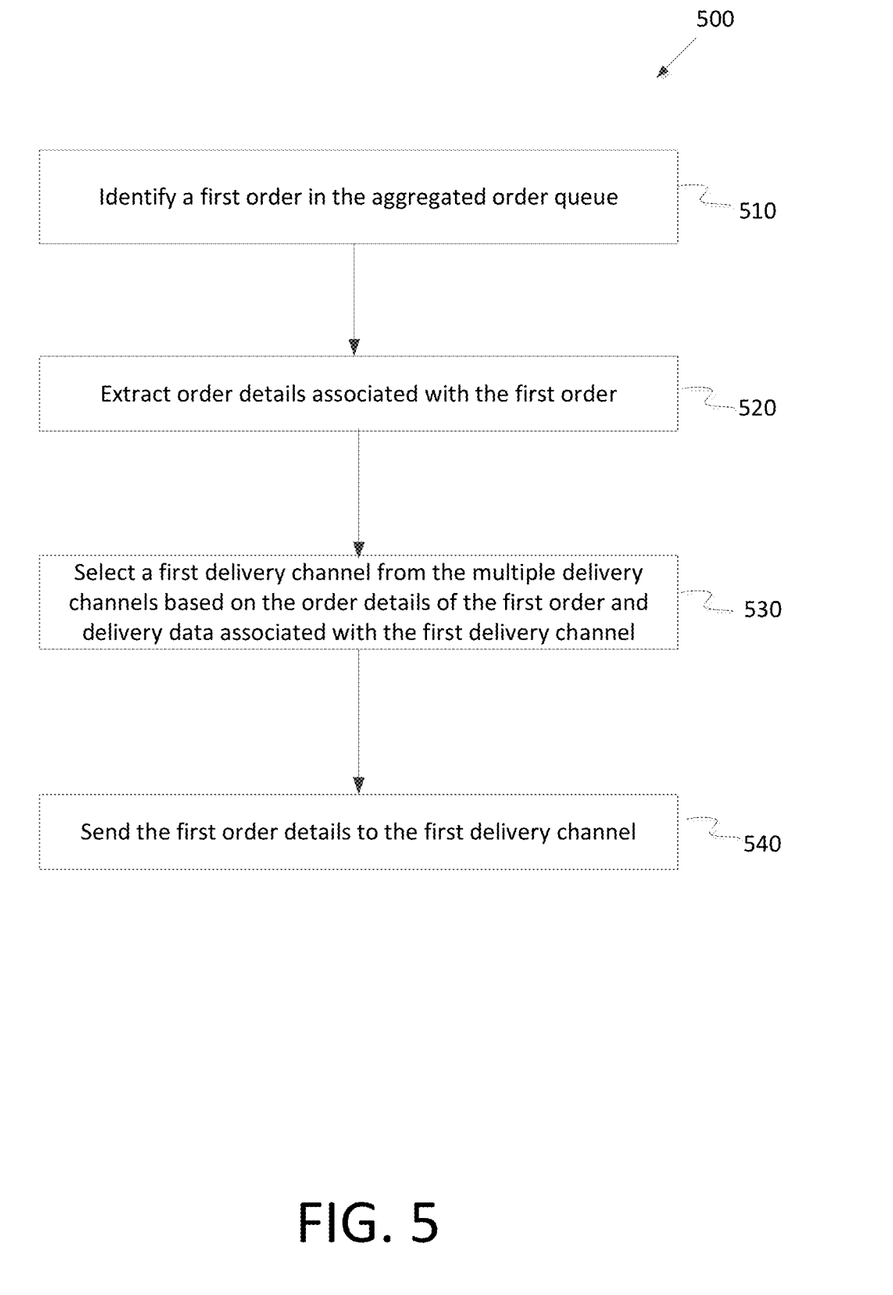
FIG. 5 depicts a flowchart illustrating one example of functionality implemented by an order management system, according to various embodiments of the present disclosure.

FIG. 5 illustrates a flowchart that provides one example of an order management process 500 executed by an order management application 100 executed by a merchant system, according to various implementations of the present disclosure. It is understood that the flowchart of FIG. 5 provides an example of the many different types of functional arrangements that may be employed to implement the operation of the order management application 100 as described herein. As an alternative, the flowchart of FIG. 5 may be viewed as depicting an example of steps of a method implemented in the computing environment 300 of FIG. 3, according to one or more embodiments.

In block 510, a first order in an aggregated order queue is identified. The aggregated order queue may include any number of current or pending orders. The aggregated order queue may list the pending orders in a particular sequence (e.g., in order based on a time the order was received), by ordering channel, by geographic region, by a size of an order (e.g., orders having the most items or the highest estimated preparation time may be listed with a priority), by a customer rating (e.g., preferred customers may be listed with a priority), etc. To this end, the "first order" identified by the order management application not be a topmost order listed in the aggregated order queue. For example, the order identified for processing may be listed in a fifth position in the aggregated order queue, but one or more other factors may be considered by the order management system in identifying the prioritized order (e.g., a size of the order, a special request from the customer or ordering channel, a priority status associated with the order, etc.)

In block 520, order details associated with the order are extracted. The extracted order details may relate to aspects and information about the order that are selected by the merchant to enable a preferred approach to fulfillment of the orders. For example, a merchant may use the order management application to define certain fields that are deemed critical to fulfillment of the order and extract information from the orders corresponding to those fields (e.g., item(s) ordered, a time the order was placed, an expected time of delivery, a customer identity, etc.) Extracting the order details and causing the extracted order details to be displayed via an interface of the merchant system enables the merchant to fulfill the order.

In block 530, a first delivery channel of the multiple candidate delivery channels is selected. In an implementation, the first delivery channel may be selected based on the order details of the first order and the delivery data associated with the first delivery channel (as described above in detail in connection with block 460 of FIG. 4). For example, the first delivery channel may be selected based on a comparison of the delivery data of the first delivery channel, a second delivery channel, and a third delivery channel. Based on the comparison, the order management application may determine that the first delivery channel is preferred as it relates to the first order.

In an implementation, the selection of the first delivery channel may be based on a load balancing model employed by the order management application. Accordingly, the order management application may use the delivery data for the multiple delivery channels and the order details in the aggregated order queue to balance the delivery load of the set of available delivery channels.

In block 540, at least a portion of the first order details are sent to the first delivery channel for performance of the delivery of the first order. In an implementation, a communication may be received from the first delivery channel confirming receipt of the delivery request. The first order details, or portion thereof, sent to the delivery channel provide the necessary information for delivery of the first order to the associated customer (e.g., a description of the order, a delivery address, an estimated or expected delivery time, an estimated or expected time for the delivery channel to pick up the order from the merchant, etc.)

Figure 6:
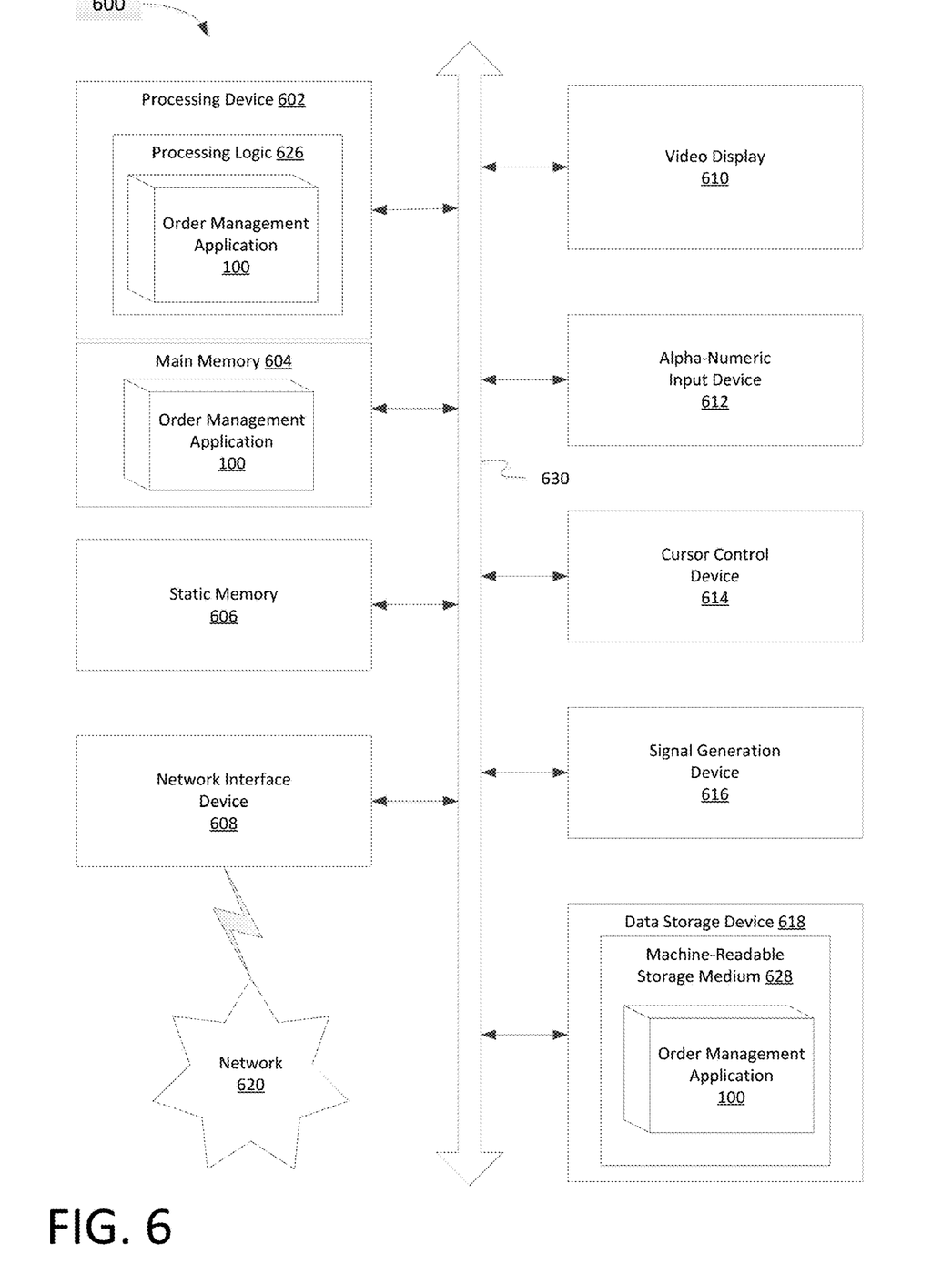
FIG. 6 is a schematic block diagram that provides one example illustration of a computing environment executing an order management application employed in the networked environment of FIG. 3, according to various embodiments of the present disclosure.

FIG. 6 illustrates a diagrammatic representation of a machine in the exemplary form of a computer system 600 within which a set of instructions, for causing the machine to perform any one or more of the methodologies discussed herein, may be executed. The system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may represent computing device(s) 301 of FIG. 3.

The exemplary computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions for a document classification system 100 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions of the order management application 100 embodying any one or more of the methodologies or functions described herein. The instructions may also reside, completely or at least partially, within the main memory 604 and/or within processing logic 626 of the processing device 602 during execution thereof by the computer system 600, the main memory 604 and the processing device 602 also constituting computer-readable media.

The instructions may further be transmitted or received over a network 620 via the network interface device 608. While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "extracting", "aggregating", "determining", "selecting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   integrating, by a processing device, a plurality of food ordering channels into a single application executed by the processing device, wherein each of the plurality of food ordering channels is associated with a different application enabling ordering from a plurality of merchants, and wherein the single application is configured to interface with each of the different applications via a different corresponding application program interface (API) to receive and process a plurality of food orders;
   receiving, by the single application via a first API associated with a first food ordering channel of the plurality of food ordering channels, a first food order from the first food ordering channel, wherein the first food order is received by the first food ordering channel from a first user device in a first format;
   receiving, by the single application via a second API associated with a second food ordering channel of the plurality of food ordering channels, a second food order from the second food ordering channel, wherein the second food order is received by the second food ordering channel from a second user device in a second format;

converting, by the single application, the first food order from a first format associated with the first food ordering channel to a uniform format associated with the single application;

converting, by the single application, the second food order of the plurality of food orders from a second format associated with the second food ordering channel to the uniform format associated with the single application;

aggregating, by the single application executed by the processing device, the first food order in the uniform format and the second food order in the uniform format into an aggregated order queue;

causing, by the single application, at least a portion of the aggregated order queue to be displayed via an interface of the user device;

selecting a first delivery channel of a plurality of delivery channels to manage delivery of the first food order based at least in part on first data received from a first system associated with the first delivery channel;

selecting a second delivery channel of the plurality of delivery channels to manage delivery of the second food order based at least in part on second data received from a second system associated with the first delivery channel;

transmitting first details associated with the first food order to the first system associated with the first delivery channel; and transmitting second details associated with the second food order to the second system associated with the second delivery channel.

2. The method of claim 1, further comprising:
coordinating with the first system associated with the first delivery channel to arrange for delivery of one or more items of the first food order to a delivery address.

3. The method of claim 1, wherein the first system associated with the first delivery channel and the first food ordering channel are associated with different entities.

4. The method of claim 1,
analyzing a set of food order details of the aggregated order queue;
generating analytic data based on analyzing the set of food order details, wherein the analytic data comprises information associated with a performance of the first ordering channel and the second ordering channel; and
generating a report comprising the analytic data.

5. The method of claim 1, further comprising:
determining the first data associated with the first delivery channel, wherein the first data represents a first estimated availability for the first delivery channel; and
determining the second data associated with the second delivery channel, wherein the second data represents a second estimated availability for the second delivery channel.

6. The method of claim 1, further comprising:
receiving confirmation information from the first delivery channel relating to delivery of the first food order.

7. A system comprising:
a memory to store instructions; and
a processing device operatively coupled to the memory, the processing device to execute the instructions to:
receive, by a single application executed by the processing device via a first application programming interface (API) associated with a first food ordering channel, a first food order in a first format from the first food ordering channel of a plurality of food ordering channels, wherein each of the plurality of food ordering channels is associated with a different application enabling ordering from a plurality of merchants;

receive, by the single application via a second API associated with a second food ordering channel, a second food order in a second format from the second food ordering channel of the plurality of food ordering channels, wherein the application is configured to interface with a first application associated with the first food ordering channel and a second application associated with the second food ordering channel to intake and process the plurality of food orders;

convert, by the single application, the first food order from a first format associated with the first food ordering channel to a uniform format associated with the single application;

convert, by the single application, the second food order of the plurality of food orders from a second format associated with the second food ordering channel to the uniform format associated with the single application;

aggregate, by the single application executed by the processing device, the first food order in the uniform format and the second food order in the uniform format into an aggregated order queue;

cause, by the single application, at least a portion of the aggregated order queue to be displayed via an interface of the user device;

select a first delivery channel of a plurality of delivery channels to manage delivery of the first food order based at least in part on first data received from a first system associated with the first delivery channel;

select a second delivery channel of the plurality of delivery channels to manage delivery of the second food order based at least in part on second data received from a second system associated with the first delivery channel;

transmit first details associated with the first food order to the first system associated with the first delivery channel; and transmit second details associated with the second food order to the second system associated with the second delivery channel.

8. The system of claim 7, the processing device to:
coordinate with the first system associated with the first delivery channel to arrange for delivery of one or more items of the first food order to a delivery address.

9. The system of claim 7, wherein the first system associated with the first delivery channel and the first food ordering channel are associated with different entities.

10. The system of claim 7, the processing device to:
analyze a set of food order details of the aggregated order queue;
generate analytic data based on analyzing the set of food order details, wherein the analytic data comprises information associated with a performance of the first ordering channel and the second ordering channel; and
generate a report comprising the analytic data.

11. The system of claim 7, the processing device to:
determine the first data associated with the first delivery channel, wherein the first data represents a first estimated availability for the first delivery channel; and
determine the second data associated with the second delivery channel, wherein the second data represents a second estimated availability for the second delivery channel.

12. The system of claim 7, the processing device to:
receive confirmation information from the first delivery channel relating to delivery of the first food order.

13. A non-transitory computer-readable storage medium having computer-executable instructions stored thereon that, if executed by a processing device, cause the processing device to:
receive, by a single application executed by the processing device via a first application programming interface (API) associated with a first food ordering channel, a first food order in a first format from the first food ordering channel of a plurality of food ordering channels, wherein each of the plurality of food ordering channels is associated with a different application enabling ordering from a plurality of merchants;
receive, by the single application via a second API associated with a second food ordering channel, a second food order in a second format from the second food ordering channel of the plurality of food ordering channels, wherein the application is configured to interface with a first application associated with the first food ordering channel and a second application associated with the second food ordering channel to intake and process the plurality of food orders;
convert, by the single application, the first food order from a first format associated with the first food ordering channel to a uniform format associated with the single application;
convert, by the single application, the second food order of the plurality of food orders from a second format associated with the second food ordering channel to the uniform format associated with the single application;
aggregate, by the single application executed by the processing device, the first food order in the uniform format and the second food order in the uniform format into an aggregated order queue;
cause, by the single application, at least a portion of the aggregated order queue to be displayed via an interface of the user device;
select a first delivery channel of a plurality of delivery channels to manage delivery of the first food order based at least in part on first data received from a first system associated with the first delivery channel;
select a second delivery channel of the plurality of delivery channels to manage delivery of the second food order based at least in part on second data received from a second system associated with the first delivery channel;
transmit first details associated with the first food order to the first system associated with the first delivery channel; and
transmit second details associated with the second food order to the second system associated with the second delivery channel.

14. The non-transitory computer-readable storage medium of claim 13, the processing device to:
coordinate with the first system associated with the first delivery channel to arrange for delivery of one or more items of the first food order to a delivery address.

15. The non-transitory computer-readable storage medium of claim 13, wherein the first system associated with the first delivery channel and the first food ordering channel are associated with different entities.

16. The non-transitory computer-readable storage medium of claim 13, the processing device to:
analyze a set of food order details of the aggregated order queue;
generate analytic data based on analyzing the set of food order details, wherein the analytic data comprises information associated with a performance of the first ordering channel and the second ordering channel; and
generate a report comprising the analytic data.

17. The non-transitory computer-readable storage medium of claim 13, the processing device to:
determine the first data associated with the first delivery channel, wherein the first data represents a first estimated availability for the first delivery channel; and
determine the second data associated with the second delivery channel, wherein the second data represents a second estimated availability for the second delivery channel.

18. The non-transitory computer-readable storage medium of claim 13, the processing device to:
receive confirmation information from the first delivery channel relating to delivery of the first food order.

* * * * *